United States Patent
Hasegawa et al.

(10) Patent No.: US 11,749,517 B2
(45) Date of Patent: Sep. 5, 2023

(54) ION SOURCE

(71) Applicant: Hitachi High-Tech Corporation, Tokyo (JP)

(72) Inventors: Hideki Hasegawa, Tokyo (JP); Masuyuki Sugiyama, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 153 days.

(21) Appl. No.: 17/286,054

(22) PCT Filed: Oct. 10, 2019

(86) PCT No.: PCT/JP2019/039937
§ 371 (c)(1),
(2) Date: Apr. 16, 2021

(87) PCT Pub. No.: WO2020/095611
PCT Pub. Date: May 14, 2020

(65) Prior Publication Data
US 2021/0358734 A1    Nov. 18, 2021

(30) Foreign Application Priority Data

Nov. 8, 2018  (JP) ................ 2018-210453

(51) Int. Cl.
*H01J 49/16*    (2006.01)
*H01J 49/04*    (2006.01)
*G01N 30/72*    (2006.01)

(52) U.S. Cl.
CPC ........ *H01J 49/167* (2013.01); *G01N 30/7266* (2013.01); *H01J 49/0445* (2013.01); *H01J 49/0477* (2013.01)

(58) Field of Classification Search
CPC .. H01J 49/167; H01J 49/0445; H01J 49/0477; G01N 30/7266
(Continued)

(56) References Cited

U.S. PATENT DOCUMENTS

| 4,278,868 A | * | 7/1981 | Rudd | ................. | B23K 9/08 |
| | | | | | 219/60 R |
| 2003/0164225 A1 | * | 9/2003 | Sawayama | ........ | H01J 37/32834 |
| | | | | | 118/715 |

(Continued)

FOREIGN PATENT DOCUMENTS

| EP | 1684328 A2 | 7/2006 |
| EP | 2260503 A2 | 12/2010 |

(Continued)

OTHER PUBLICATIONS

Search Report dated Dec. 17, 2019 in corresponding International Application No. PCT/JP2019/039937.

(Continued)

*Primary Examiner* — Nicole M Ippolito
(74) *Attorney, Agent, or Firm* — MILES & STOCKBRIDGE, P.C.

(57) ABSTRACT

An object of the present invention is to improve the safety and stability of an ion source by making a temperature distribution of a heated gas uniform while ensuring heat insulating properties. The ion source according to the present invention includes a gas introduction port inside a probe holder that holds an ion probe. A heater that increases the temperature of a heated gas and the gas introduction port are connected by a plurality of pipes which extend along an extending direction of the ion probe and are independent of each other (see FIG. 4).

13 Claims, 20 Drawing Sheets

(58) Field of Classification Search
USPC .................................. 250/281, 282, 283, 288
See application file for complete search history.

(56) References Cited

U.S. PATENT DOCUMENTS

2003/0228240 A1* 12/2003 Dwyer .................. H01J 49/164
422/400
2015/0060566 A1 3/2015 Nakano

FOREIGN PATENT DOCUMENTS

| EP | 2688087 A2 | 1/2014 |
| JP | 6136773 B2 | 5/2017 |
| WO | 2009124298 A2 | 10/2009 |

OTHER PUBLICATIONS

Written Opinion dated Dec. 17, 2019 in corresponding International Application No. PCT/JP2019/039937.
Search Report dated Jun. 28, 2022 in European Application No. 19883039.0.

* cited by examiner 0-50  50-100  100-150  ■150-200

(UNIT : °C)

ION SOURCE

TECHNICAL FIELD

The present invention relates to an ion source.

BACKGROUND ART

In an ionization method such as an electrospray ionization method (hereinafter referred to as "ESI method") used for mass spectrometry or the like, it is important to vaporize a sample solution sprayed from a capillary with a heated gas in order to improve the ionization efficiency.

A general mass spectrometer using an ionization method includes an ion source that ionizes the sample solution according to, for example, the ESI method. Since the heated gas used for the ionization has an extremely high temperature, it is desirable to thermally insulate a portion touched by a user from the heated gas. For example, when the ion source is attached to a chamber, it is desirable to thermally insulate an upstream portion of the ion source from the heated gas if the upstream portion of the ion source is exposed to the outside of the chamber.

The following PTL 1 describes a configuration for dealing with the above problems. In this literature, a gas heater is arranged at a lower end position of an ionization probe in order to thermally insulate a portion accessed by a user and a housing of an ion source, thereby thermally insulating an upstream portion. Further, a heating range is ensured by arranging a gas inlet and a gas outlet at opposite positions and arranging an annular heater divided into two parts therebetween in order to efficiently heat a gas only within a narrow range of a lower end portion. Further, a center of a heated gas spray nozzle and a center of a heated gas flow path are made eccentric so that it is possible to supply a higher-temperature gas on the downstream of the gas flow path to the nozzle.

CITATION LIST

Patent Literature

PTL 1: Japanese Patent No. 6136773

SUMMARY OF INVENTION

Technical Problem

In PTL 1, since the center of the heated gas spray nozzle is eccentric with respect to the center of the heated gas flow path, the gas temperature varies in the radial direction. In addition, there is only one gas inlet for the heated gas flow path, and thus, the temperature on the inlet side decreases due to the influence of a low-temperature gas before heating, which also leads to the variation in the gas temperature in the radial direction. Further, the temperature of the heated gas also differs depending on a position in the heated gas flow path, which also leads to the variation in the gas temperature in the radial direction.

The present invention has been made in view of the above problems, and an object of the present invention is to improve the safety and stability of an ion source by making a temperature distribution of a heated gas uniform while ensuring heat insulating properties.

Solution to Problem

An ion source according to the present invention includes a gas introduction port inside a probe holder that holds an ion probe. A heater that increases the temperature of a heated gas and the gas introduction port are connected by a plurality of pipes which extend along an extending direction of the ion probe and are independent of each other.

Advantageous Effects of Invention

According to the ion source of the present invention, an upstream portion of the ion source that is likely to be accessed by a user can be separated from a heater by separating the heater and the gas introduction port by the pipes. As a result, the safety of the ion source is improved. Further, the distribution of the heated gas in the heater is made uniform by supplying the heated gas to the heater through the plurality of pipes. As a result, the temperature distribution and a flow rate distribution of the heated gas can be made uniform, so that the stability is improved.

DESCRIPTION OF EMBODIMENTS

<Regarding Conventional Ion Source>

Figure 1:
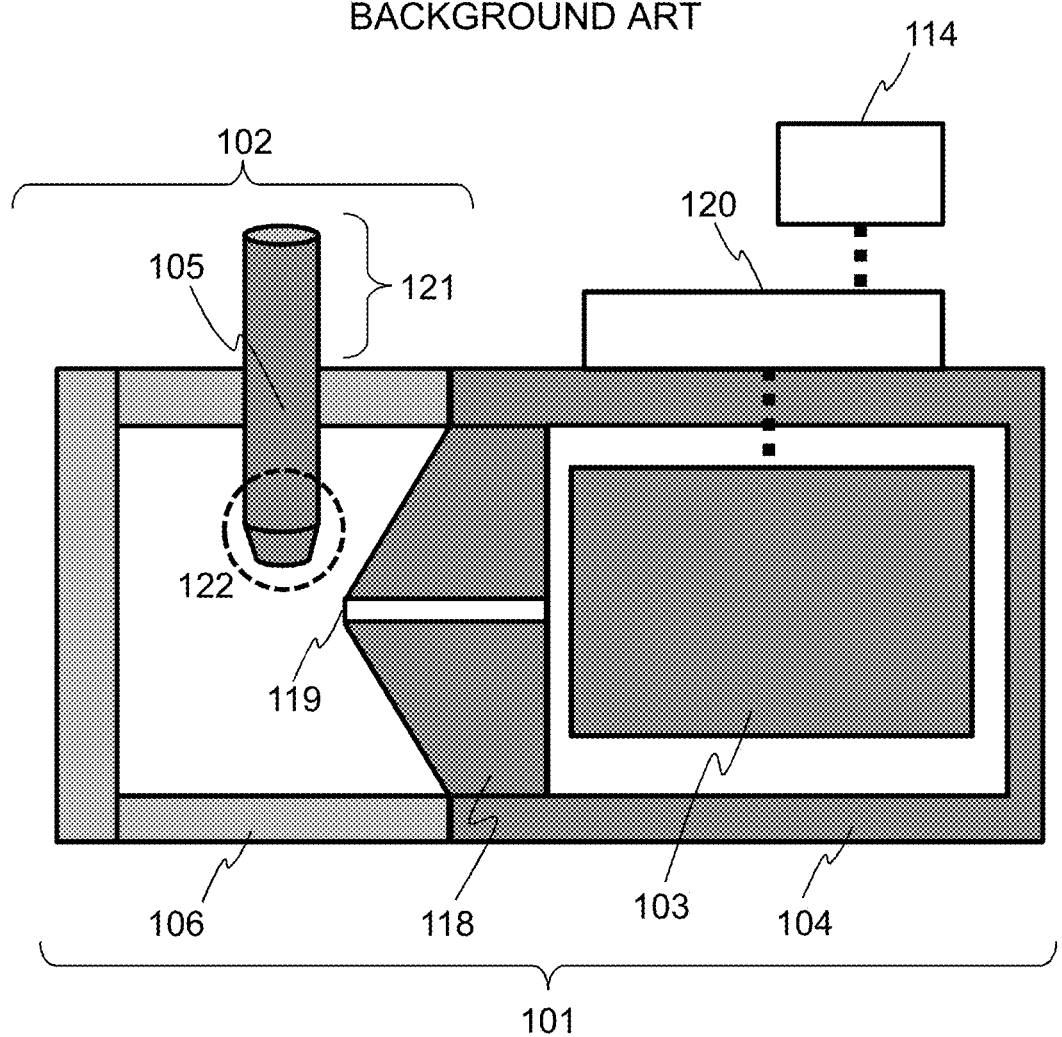
FIG. 1 is a diagram illustrating a configuration of a conventional general mass spectrometer.

FIG. 1 is a diagram illustrating a configuration of a conventional general mass spectrometer. A mass spectrometer 101 is mainly formed by an ion source 102, a vacuum container 104, and the like. The vacuum container 104 houses a mass spectrometry unit 103 therein. The ion source 102 is mainly formed by an ion generator 105, an ion source chamber 106, and the like.

Ions generated by the ion source 102 are introduced into the vacuum container 104 through a hole 119 of an introduction electrode 118, and the mass spectrometry unit 103 analyzes the ions. Various voltages are applied to the mass spectrometry unit 103 by a power supply 120. A voltage application timing of the power supply 120 and a voltage value are controlled by a controller 114. An upper portion 121 will be described later.

Figure 2:
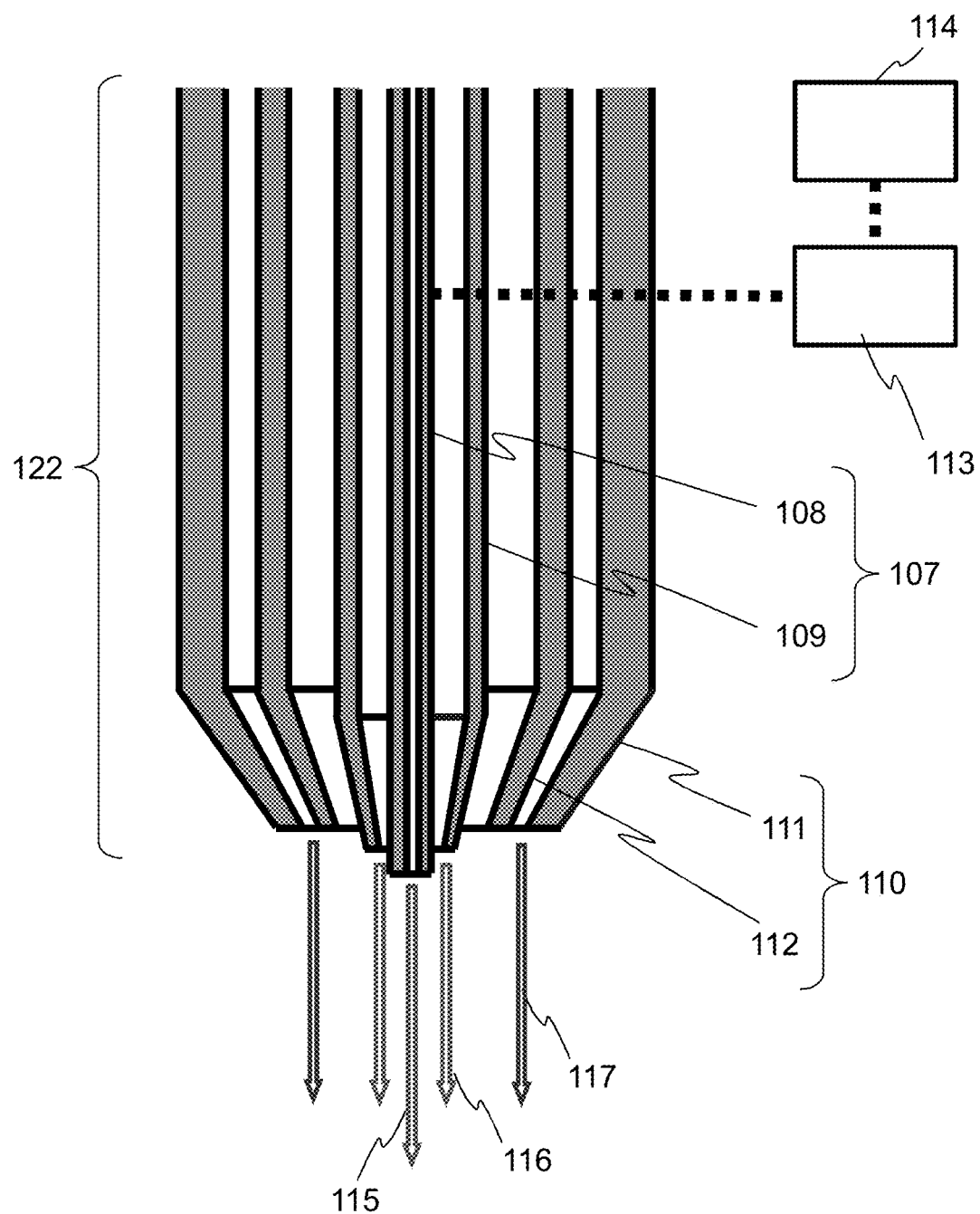
FIG. 2 is a diagram illustrating a general detailed structure of a distal end portion 122 of an ion generator 105.

FIG. 2 is a diagram illustrating a general detailed structure of a distal end portion 122 of the ion generator 105. The distal end portion 122 generates ions of a sample solution by a principle which is referred to as an electrospray ionization method (ESI). The ion generator 105 is mainly formed by a capillary 108, a gas spray tube 109, and a heated gas spray nozzle unit 110. An assembly in which the capillary 108 and the gas spray tube 109 are combined is referred to as an ionization probe 107.

The sample solution introduced from the upstream of the capillary 108 is ionized by applying a high voltage to the capillary 108 from the power supply 113, and then the ions are sprayed as indicated by an arrow 115. A high voltage application timing of the power supply 113 and a voltage value are controlled by the controller 114. Components sprayed as indicated by the arrow 115 include charged droplets as well as the generated ions. Since the ionization efficiency is improved by vaporizing and evaporating the charged droplets and the like, a method of spraying a gas as indicated by an arrow 116 using the gas spray tube 109, a method of spraying a heated gas as indicated by an arrow 117 using the heated gas spray nozzle unit 110, and the like are used. The heated gas is sprayed from between an outer cylinder 111 and an inner cylinder 112 forming the heated gas spray nozzle unit 110.

Since the heated gas used for ionization has an extremely high temperature, it is desirable that the upper portion 121 of the ion generator 105, the ion source chamber 106, the vacuum container 104, and the like be thermally insulated by being thermally separated from the heated gas. This is because of the following reasons. The upper portion 121 is generally provided with a sample solution introduction connector (not illustrated), a position adjustment mechanism (not illustrated) for the ionization probe 107, and the like, and thus, the upper portion 121 is frequently accessed by a user. Meanwhile, when the ion source chamber 106 or the vacuum container 104 is heated, the temperature of the power supply 120 in the vicinity thereof also rises, so that a temperature variation of the power supply 120 leads to a variation of an analysis result. Therefore, it is necessary to thermally insulate these members from the heated gas.

First Embodiment

Figure 3:
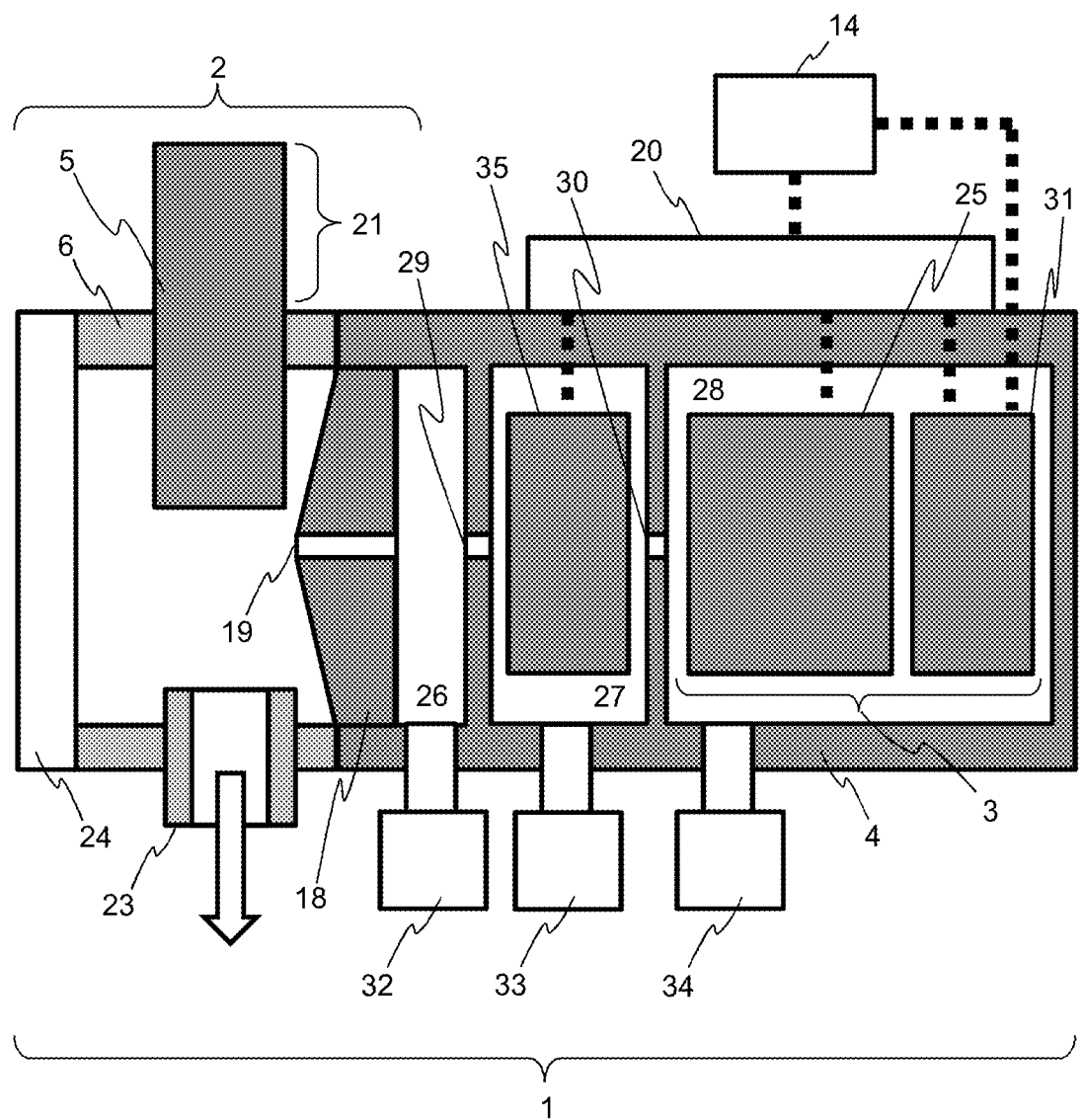
FIG. 3 is a configuration diagram of a mass spectrometer 1 according to a first embodiment.

FIG. 3 is a block diagram of a mass spectrometer 1 according to a first embodiment of the present invention. The mass spectrometer 1 is mainly formed by an ion source 2, a vacuum container 4, and the like. The vacuum container 4 houses a mass spectrometry unit 3 and the like therein. The ion source 2 is mainly formed by an ion generator 5, an ion source chamber 6, and the like.

Ions generated by the ion source 2 are introduced into the vacuum container 4 through a hole 19 of an introduction electrode 18, and the mass spectrometry unit 3 analyzes the ions. There is a case where a sealed state (or a nearly sealed state) is formed between the ion source chamber 6 and the vacuum container 4 such that components such as a gas and a droplet that are not introduced into the vacuum container 4 do not leak to the outside of the device. Furthermore, an exhaust port 23 configured to exhaust such excess gas and droplet may be provided. Further, a window 24 made of a transparent member, such as glass, may be provided in a part of the ion source chamber 6 in order to observe a spray state at a distal end of a capillary 8. Various voltages are applied to the mass spectrometry unit 3 by a power supply 20. A controller 14 controls a voltage application timing of the power supply 20 and a voltage value.

The mass spectrometry unit 3 is formed by an ion analyzer 25, a detector 31, and the like. The ion analyzer 25 separates and dissociates ions. As the ion analyzer 25, an ion trap, a quadrupole filter electrode, a collision cell, a time-of-flight mass spectrometer (TOF), a configuration combining these, and the like can be used.

The detector 31 detects ions that have passed through the ion analyzer 25. As the detector 31, an electron multiplier tube, a multi-channel plate (MCP), and the like can be used. The ions detected by the detector 31 are converted into an electric signal or the like. The controller 14 uses the signal to analyze information such as the mass and intensity of ions in detail. The controller 14 includes an input/output unit that receives an instruction input from a user, a memory that stores data to control a voltage, and the like. Furthermore, the controller 14 also includes software required to control the power supply or the like.

As the voltage supplied from the power supply 20 to the mass spectrometry unit 3, a high frequency voltage, a DC voltage, an AC voltage, a voltage combining these, and the like can be used. When high analysis accuracy is required, it is important to suppress the temperature variation of the power supply 20 itself. Further, if the distance between the power supply 20 and the mass spectrometry unit 3 is long, the accuracy of a control voltage sometimes decreases due to the influence of a wiring member therebetween particularly in the high frequency voltage. Therefore, the power supply 20 is generally arranged in the vicinity of the vacuum container 4 as illustrated in FIG. 3.

There is also a case where the inside of the vacuum container 4 is divided into a plurality of vacuum chambers 26, 27, and 28, and each vacuum chamber is connected by holes 29 and 30 each having a small diameter. The holes 19, 29, and 30 are passages for ions, and a voltage may be applied to a member having each hole. In such a case, it is necessary to insulate the members from the housing such as the vacuum container 4 using an insulator (not illustrated) or the like. The number of vacuum chambers may be either larger or smaller than that in FIG. 3. The vacuum chambers 26, 27, and 28 are exhausted by vacuum pumps 32, 33, and 34, respectively, and are generally held at about several hundred Pa, about several Pa, and about 0.1 Pa or less, respectively. Inside the vacuum chamber 27, an ion transport unit 35 that allows ions to pass while converging is arranged. As the ion transport unit 35, a multi-pole electrode, an electrostatic lens, and the like can be used. There is also a case where the ion transport unit 35 is arranged in other vacuum chambers such as vacuum chambers 26 or 28. A high frequency voltage, a DC voltage, an AC voltage, a voltage combining these, and the like are applied to the ion transport unit 35 from the power supply 20.

Figure 4:
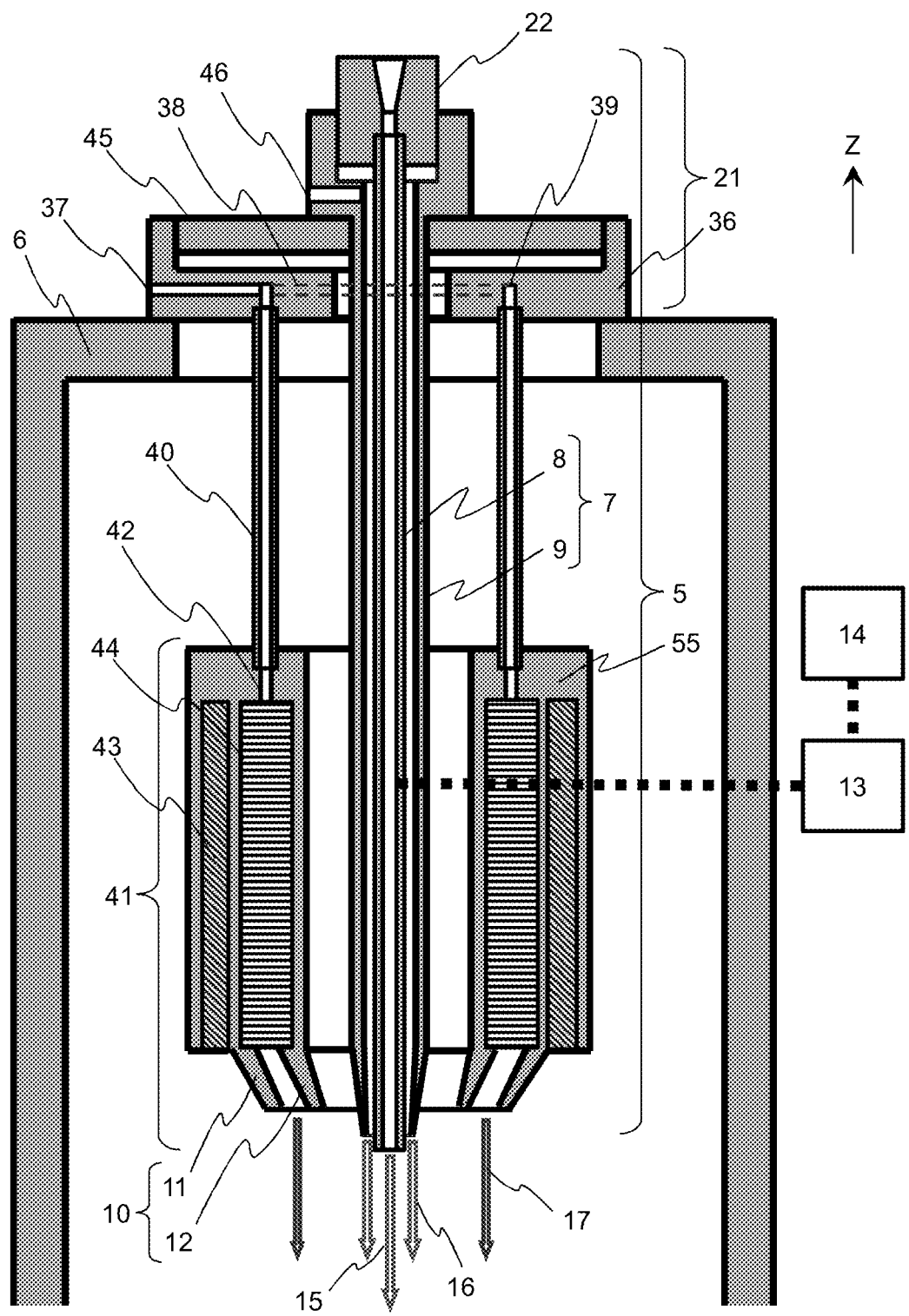
FIG. 4 is a diagram illustrating a detailed structure of an ion generator 5.

FIG. 4 is a diagram illustrating a detailed structure of the ion generator 5. The ion generator 5 generates ions of a sample solution by a principle which is referred to as an electrospray ionization method (ESI). The ion generator 5 is formed by the capillary 8, a gas spray tube 9, a heated gas spray nozzle unit 10, and the like. An assembly in which the capillary 8 and the gas spray tube 9 is combined is referred to as an ionization probe 7. There is also a case where the gas spray tube 9 is not always required depending on a flow rate condition of the sample solution.

The sample solution introduced from the upstream of the capillary 8 is ionized by applying a high voltage to the capillary 8 from the power supply 13, and then the ions are sprayed as indicated by an arrow 15. The controller 14 controls a high voltage application timing of the power supply 13 and a voltage value. The value of the high voltage applied to the capillary 8 is generally about several kV (absolute value). When generating positive ions, a voltage of +several kV is applied to the capillary 8. When generating negative ions, a voltage of −several kV is applied to the capillary 8. Generally, an inner diameter of the capillary 8 is set to 1 mm or less. A flow rate of the sample solution depends on the inner diameter of the capillary 8, but is generally set in a range of nL/minute to mL/minute. The sample solution is supplied to the capillary 8 via a pipe (not illustrated) connected to a connector 22. The connector 22 and the capillary 8 may be connected using a connector (not illustrated) or the like, or may be integrated by welding, adhesion, press-fitting, or the like. Further, the connector 22 and the capillary 8 may be connected using a pressing force or the like by a pressurizing means such as a spring.

In a process of the ion generation principle of the ESI method, droplets of the sample solution are repeatedly broken up and finally become extremely fine droplets to be ionized. Droplets that have not been made sufficiently fine in the process of ionization include neutral droplets and charged droplets. Therefore, components sprayed as indicated by the arrow 15 include charged droplets as well as the generated ions. Since the ionization efficiency is improved by vaporizing and evaporating the charged droplets and the like, a method of spraying a gas as indicated by an arrow 16 using the gas spray tube 9, a method of spraying a heated gas as indicated by an arrow 17 using the heated gas spray nozzle unit 10, and the like are used.

The heated gas is sprayed from between an outer cylinder 11 and an inner cylinder 12 forming the heated gas spray nozzle unit 10. The outer cylinder 11 and the inner cylinder 12 are formed in a double annular shape, whereby a heated gas ejection port has an annular shape. Generally, a flow rate of a gas sprayed from the gas spray tube 9 as indicated by the arrow 16 is about 0.5 to 10 L/minute, and a flow rate of a heated gas sprayed by the heated gas spray nozzle unit 10 as indicated by the arrow 17 is about 0.5 to 50 L/minute. Both the cases generally use an inert gas such as nitrogen and argon.

A gas in a low-temperature state, which is a source of the heated gas, is introduced via a pipe (not illustrated) connected to the hole 37 of a gas flow path branch unit 36. The gas branches into a plurality of parts at a branch flow path 38 (dotted-line portion) inside the gas flow path branch unit 36, and reaches a plurality of outlets 39. The gas passes through a plurality of pipes 40 connected to the plurality of outlets 39, respectively, and reaches inlets 42 of the gas heater 41. The pipe 40 and the outlet 39, and the pipe 40 and the inlet 42 may be connected using a connector (not illustrated) or the like, or these members may be integrated by welding, adhesion, press-fitting, or the like. Further, these members may be connected using a pressing force or the like by a pressurizing means such as a spring.

The gas heater 41 is formed by a heating block 55, a heat generator 43, a heat exchanger 44, the heated gas spray nozzle unit 10, and the like. These members can also be configured as integrated parts.

In FIG. 4, the gas flow path branch unit 36 is connected to the ion source chamber 6. A position adjustment mechanism (A: not illustrated) using a screw mechanism or a slide mechanism is arranged therebetween, so that a position of the ion generator 5 with respect to the ion source chamber 6 (the hole 19 of the introduction electrode 18) can be adjusted. A position of the ionization probe 7 with respect to the gas heater 41 can be adjusted by arranging a position adjustment mechanism (B: not illustrated) between a member 45 to which the gas spray tube 9 is attached and the gas flow path branch unit 36. The member 45 may have a structure integrated with the gas spray tube 9 and other members. A position of the gas spray tube 9 with respect to the capillary 8 can be adjusted by arranging a position adjustment mechanism (C: not illustrated) between the gas spray tube 9 and the connector 22. The position adjustment mechanisms A, B, and C are generally provided with XYZ-axis, Z-axis, and Z-axis adjustment functions, respectively, but are not limited thereto (see FIGS. 4 and 5 for the definition of the XYZ axes).

A gas to the gas spray tube 9 is introduced via a pipe (not illustrated) connected to an upstream hole 46 of the gas spray tube 9. The holes 37 and 46 of the respective gas introduction ports may be provided on individual members, and a gas may be introduced through the members.

Figure 5:
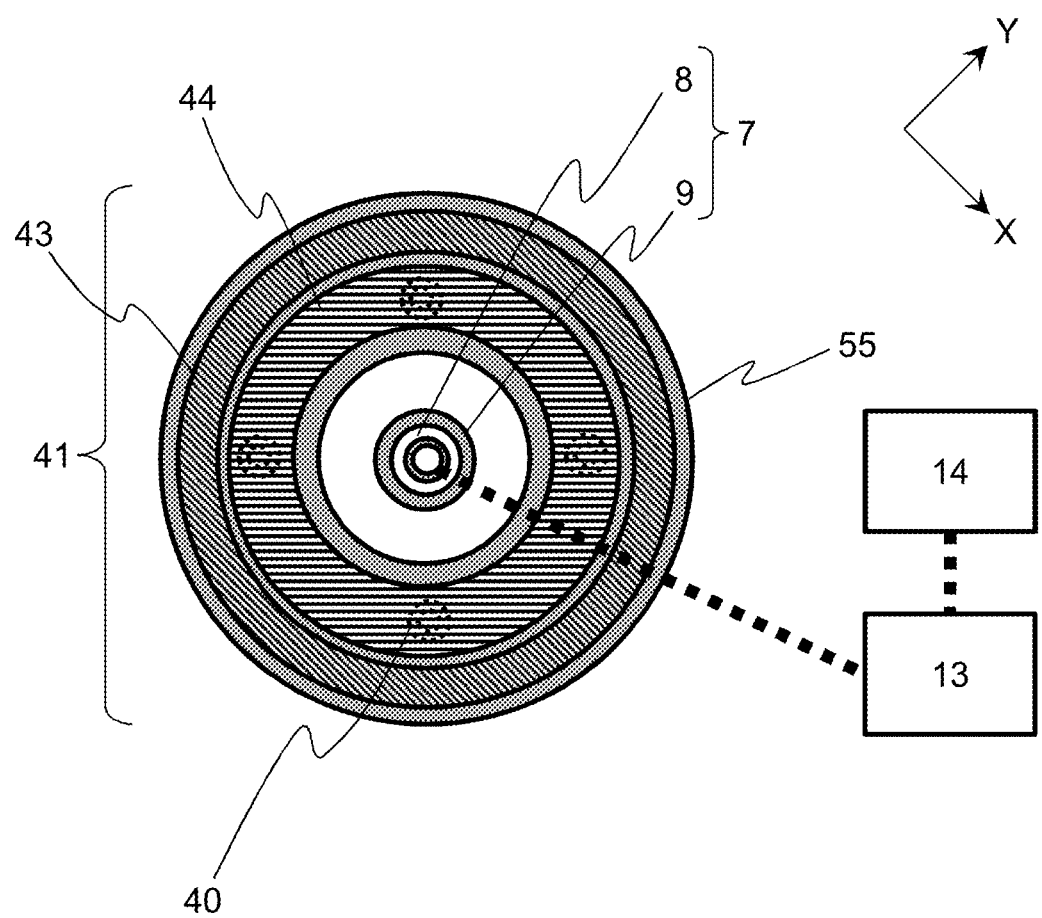
FIG. 5 is a cross-sectional view of a gas heater 41 cut along a plane perpendicular to an extending direction of a capillary 8.

FIG. 5 is a cross-sectional view of the gas heater 41 cut along a plane perpendicular to an extending direction of the capillary 8. As illustrated in FIG. 5, the gas heater 41 is formed in an annular shape surrounding the periphery of the ionization probe 7 in the first embodiment, but may be formed in other shapes. As the heat generator 43, various types can be used, such as an annular heater, a structure in which a film-shaped heater is wound in an annular shape, or a structure in which a resistor is wound. Further, a configuration symmetrical (or nearly symmetrical) in the radial direction may be adopted by arranging a plurality of rod-shaped heaters or plate-shaped heaters in the periphery or the like. There is a case where the gas heater 41 is heated up to about 800° C. Four pipes 40 are used in the first embodiment. It is possible to realize a configuration in which each heat insulation efficiency is high by connecting the gas heater 41 (high-temperature portion) and the gas flow path branch unit 36 (low-temperature portion) using the plurality of pipes 40 as in the first embodiment.

Figure 6:
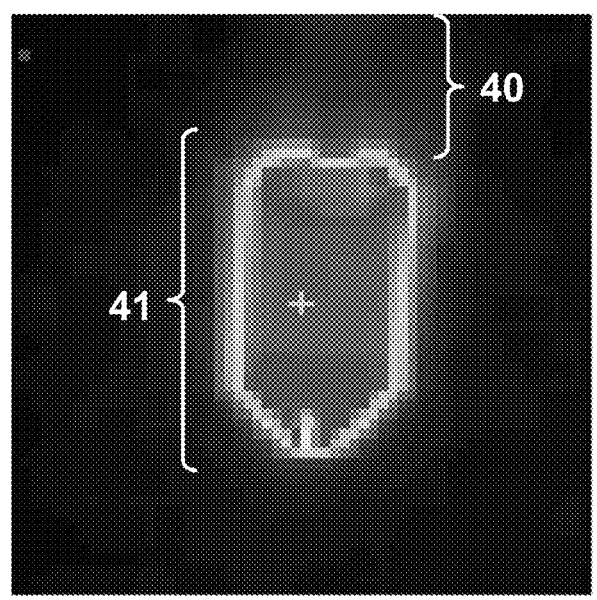
FIG. 6 is a temperature distribution image of a pipe 40 and the gas heater 41.
Figure 6:
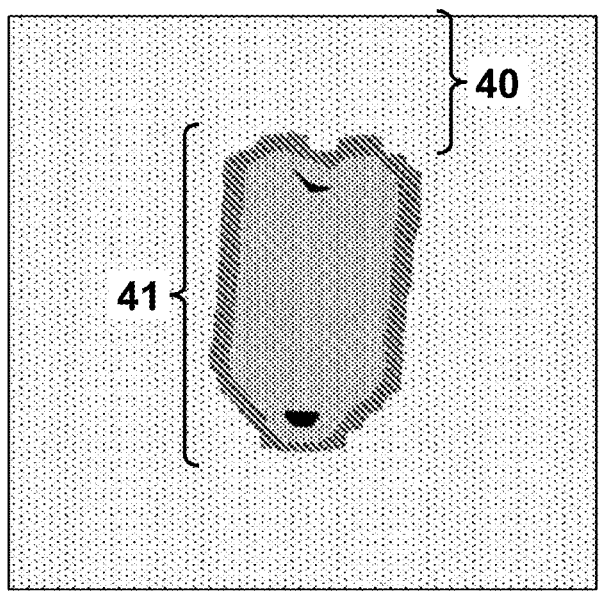

FIG. 6 is a temperature distribution image of the pipe 40 and the gas heater 41. The upper part of FIG. 6 is a thermography image, and the lower part of FIG. 6 is temperature plot data. FIG. 6 illustrates an example in which the gas heater 41 is connected by the four pipes 40 each having a length of about 50 mm, an inner diameter of 0.5 mm, and an outer diameter of 1 mm. A preset temperature is 200° C. As illustrated in FIG. 6, it can be understood that a portion of the pipe 40 does not generate heat. If a flow rate of a flowing gas becomes high, the pipe 40 is further cooled, so that the heat insulating performance is improved. The heat insulation efficiency increases as a cross-sectional area of the pipe 40 decreases, and thus, it is desirable that the outer diameter of the pipe 40 be about 5 mm or less although the insulation efficiency also depends on the number of the pipes 40.

It is possible to realize the configuration in which each heat insulation efficiency is high by connecting the gas heater 41 (high-temperature portion) and the gas flow path branch unit 36 (low-temperature portion) using the plurality of pipes 40. As a result, an upper portion 21 that is accessed by a user at the time of attaching the pipe to the connector 22 or adjusting the position does not become a high temperature, and thus, the safety is improved. Further, the heat conducted through the ion source chamber 6 and the vacuum container 4 is also suppressed due to the high heat insulation performance, and thus, the temperature variation of the power supply 20 can be also suppressed so that the stability of analysis is improved.

Figure 7:
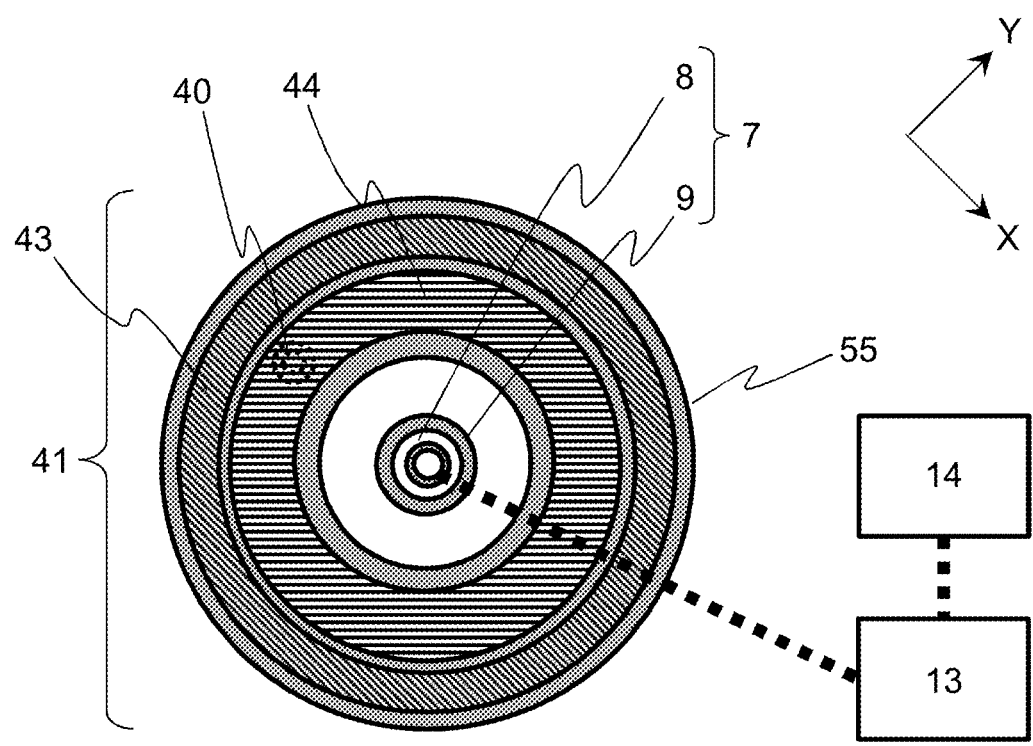
FIG. 7 is a cross-sectional view of the gas heater 41 when only one pipe 40 is arranged as a comparative example.

FIG. 7 is a cross-sectional view of the gas heater 41 when only one pipe 40 is arranged as a comparative example. The same configuration as that in FIG. 5 is adopted except for the number of pipes 40.

Figure 8:
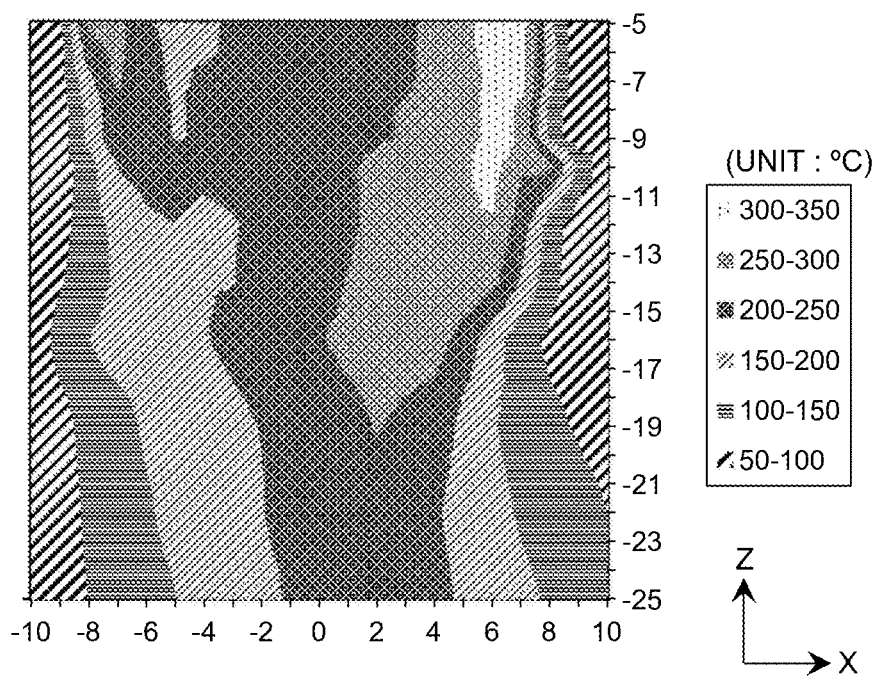
FIG. 8 is a temperature distribution diagram of the gas heater 41 illustrated in FIG. 7 in the XZ plane.

FIG. 8 is a temperature distribution diagram of the gas heater 41 illustrated in FIG. 7 in the XZ plane. As experimental conditions, a preset temperature of the gas heater 41 was set to 400° C., and a flow rate of a heated gas was set to 10 LI/minute. A position (Z=−5) lower by 5 mm than a downstream end of the heated gas spray nozzle unit 10 and a central axis (X=0) of the heated gas spray nozzle unit 10 were set as reference positions, and a temperature at each coordinate was measured while moving a temperature sensor. A sheath-type K thermocouple (Chromel-Almel type) having an outer diameter of 1 mm was used as the temperature sensor.

Figure 9:
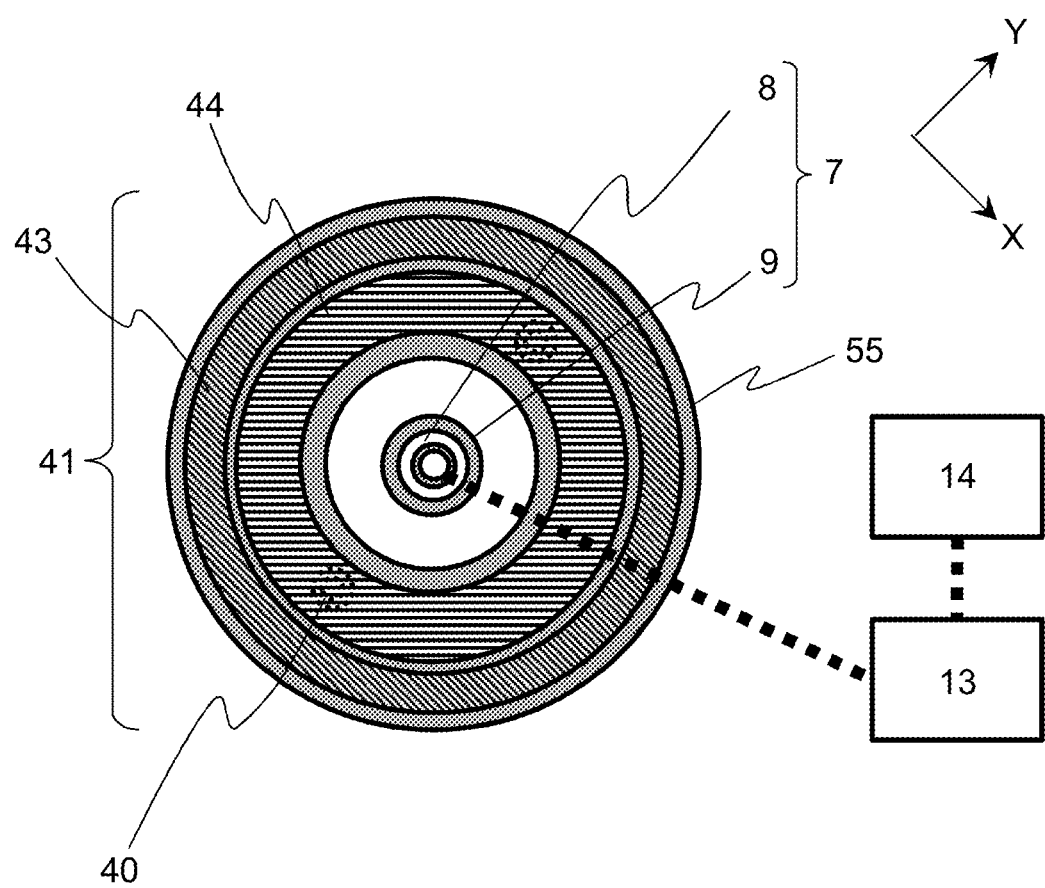
FIG. 9 is a cross-sectional view of the gas heater 41 when two pipes 40 are arranged as a comparative example.

FIG. 9 is a cross-sectional view of the gas heater 41 when two pipes 40 are arranged as a comparative example. The same configuration as that in FIG. 5 is adopted except for the number of pipes 40.

Figure 10:
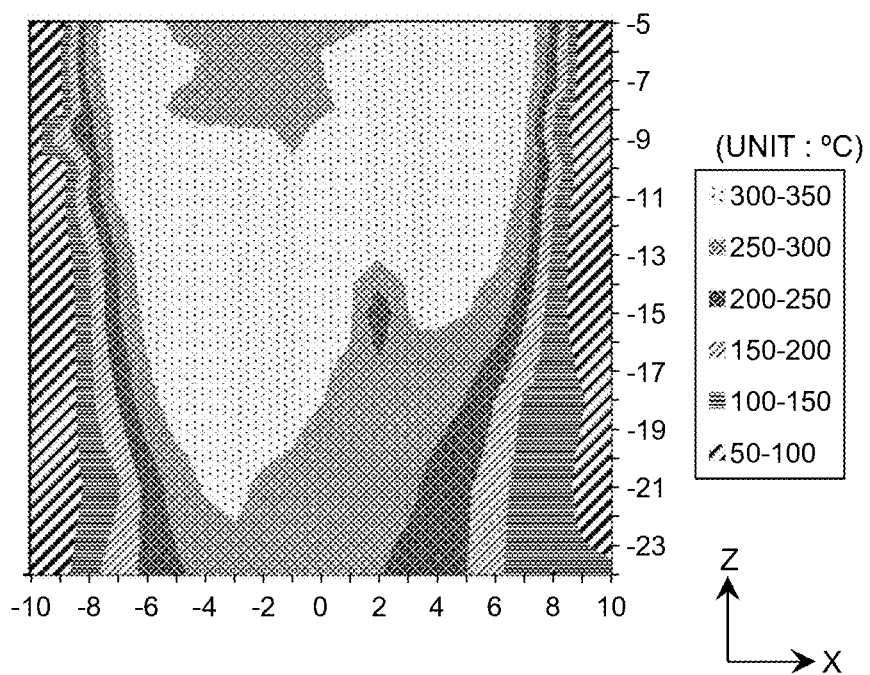
FIG. 10 is a temperature distribution diagram of the gas heater 41 illustrated in FIG. 9 in the XZ plane.

FIG. 10 is a temperature distribution diagram of the gas heater 41 illustrated in FIG. 9 in the XZ plane. Experimental conditions are the same as those in FIG. 8.

Figure 11:
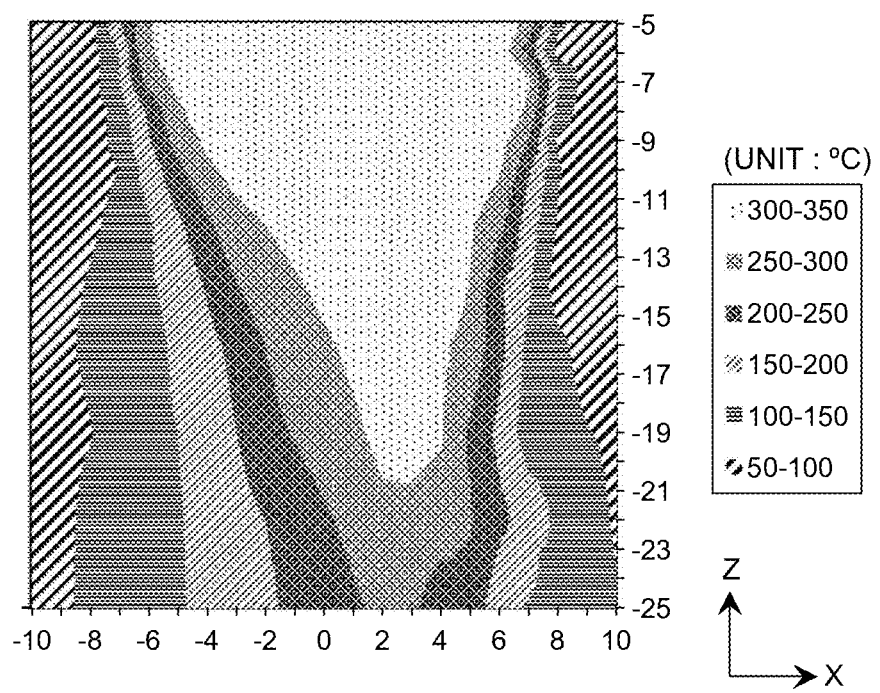
FIG. 11 is a temperature distribution diagram of the gas heater 41 illustrated in FIG. 5 in the XZ plane.

FIG. 11 is a temperature distribution diagram of the gas heater 41 illustrated in FIG. 5 in the XZ plane. Experimental conditions are the same as those in FIG. 8. When comparing FIGS. 8, 10, and 11, it can be understood that the symmetry of the temperature distribution is improved as the number of the pipes 40 increases. This is because a low-temperature gas introduced into the gas heater 41 is introduced from a plurality of positions at equal intervals when the number of the pipes 40 increases so that a radial flow rate distribution at the upper part (an initial position before heating the gas) of the gas heater 41 approaches a symmetrical shape. In addition, since heat is uniformly conducted from the plurality of pipes 40, the radial temperature distribution in the upper part of the gas heater 41 is also close to a symmetrical shape. Although the uniformity of the temperature distribution is improved as the number of the pipes 40 increases, it is practical to keep the number to about twenty or smaller considering the efficiency of assembling process. The plurality of pipes 40 are arranged at equal intervals in the first embodiment, but the present invention is not limited thereto as long as it is configured such that desired performance can be obtained.

Figure 12:
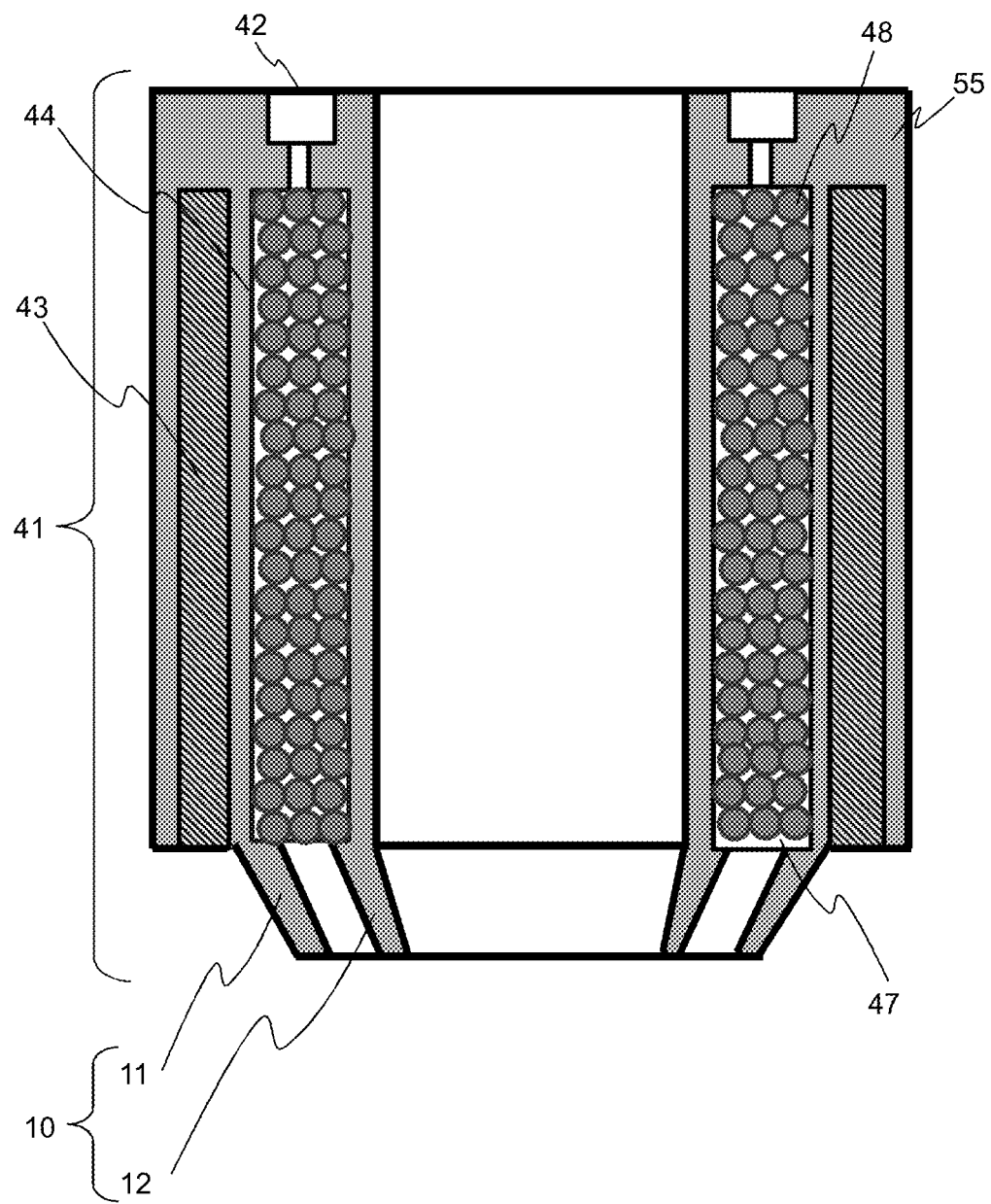
FIG. 12 is a diagram illustrating a configuration example of a heat exchanger 44.

FIG. 12 is a diagram illustrating a configuration example of the heat exchanger 44. The configuration example illustrated in FIG. 12 was used in the experiments illustrated in FIGS. 8, 10 and 11. The heat exchanger 44 is filled with ceramic balls 48 (each having an outer diameter of 1.5 mm). Actually, an annular cavity 47 inside the gas heater 41 was almost fully filled with the ceramic balls 48 as illustrated in FIG. 12. Since the filling ceramic balls 48 reduce flow path conductance, the effect of making the flow uniform in the radial direction is also obtained. Meanwhile, a total surface area of heat transfer increases due to the innumerable ceramic balls 48 that have been heated, and thus, the gas heating efficiency can also be improved. The gas heater 41 can be realized even in a narrow range near the downstream distal end portion of the ionization probe 7 by using this efficient heat exchanger 44, and thus, the heat insulation distance obtained by the pipe 40 can be increased.

The outer diameter of the ceramic ball 48 may be other than 1.5 mm, but it is desirable that the outer diameter be about 2 mm or smaller in consideration of wasteful enlargement of the device and an effective filling amount. A metal material other than ceramic may be used as long as the material has a sufficient heat resistance to the operating temperature. A shape of a filler may be a shape (for example, a polyhedron or a cylindrical shape) other than a sphere such as a ball.

First Embodiment: Summary

The ion source 2 according to the first embodiment supplies the heated gas from the hole 37 to the gas heater 41 via the plurality of pipes 40 extending along the extending direction of the ionization probe 7. As a result, the distance between the gas heater 41 and the upper portion 21 can be increased, so that the effect of thermally insulating the upper portion 21 from the gas heater can be enhanced. Therefore, the safety for the user can be enhanced.

In the ion source 2 according to the first embodiment, the pipes 40 and the inlets 42 are arranged at equal intervals on the outer circumference of the ionization probe 7. As a result, the temperature distribution and the flow rate distribution of the heated gas can be made uniform, so that the stability and reproducibility of the ion source 2 can be improved.

In a technique described in PTL 1, it is configured such that a heated gas emitted from a gas outlet of a heated gas flow path directly hits a spray gas pipe on the inner side. As a result, a capillary for a sample solution becomes hot, and there is a possibility that the solution suddenly boils. Since the sudden boiling of the sample solution causes a decrease in ionization efficiency (decrease in sensitivity), heat insulation with respect to the capillary is an important technical problem to be solved. On the other hand, the ion source 2 according to the first embodiment supplies the heated gas to the heat exchanger 44 firstly, and heats the heated gas through the heat exchanger 44, so that the heated gas is not directly sprayed to the capillary or the gas spray tube as in PTL 1. Therefore, the sample solution is less likely to suddenly boil, so that the decrease in sensitivity can be suppressed.

Second Embodiment

Figure 13:
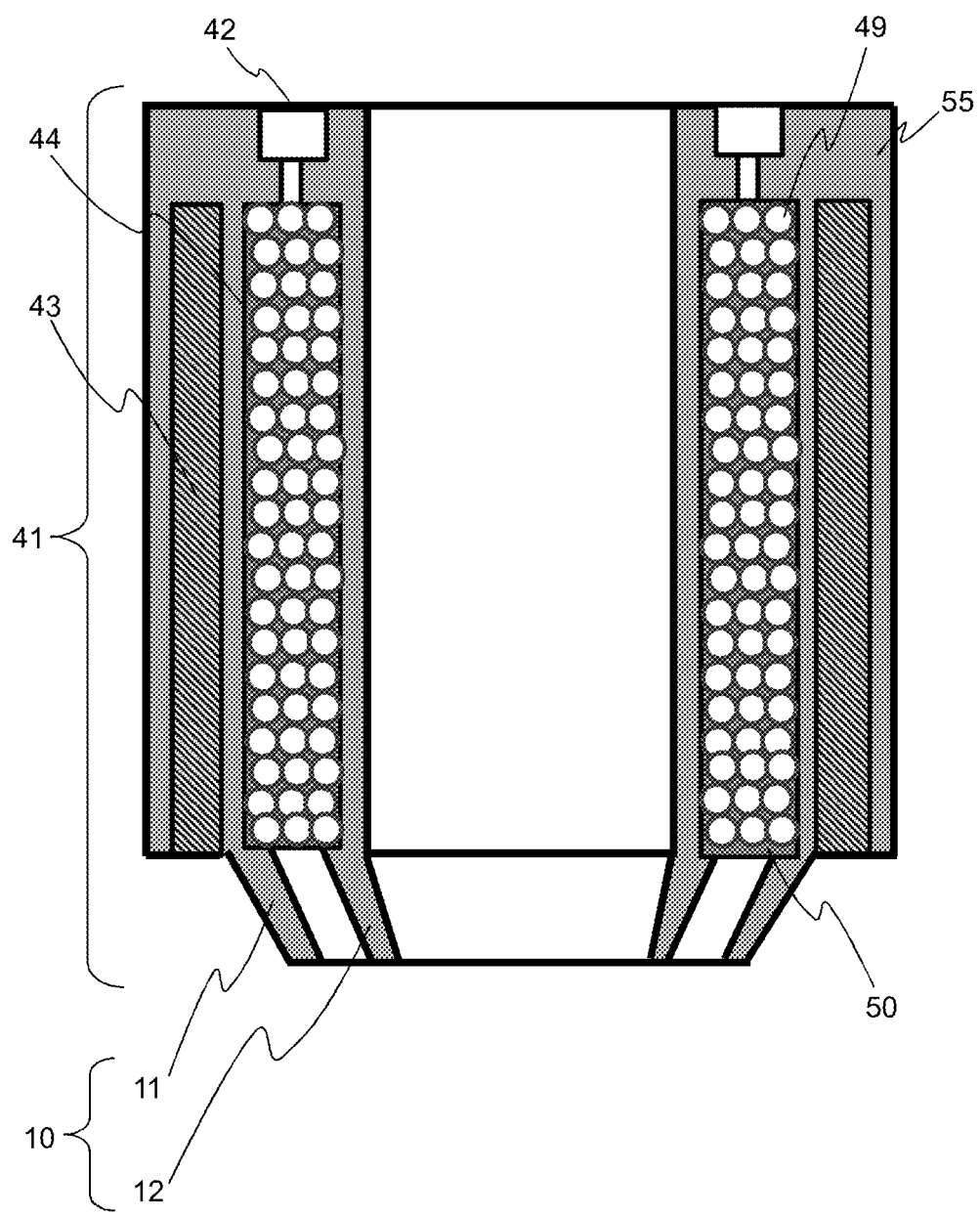
FIG. 13 is a configuration example of the gas heater 41 in a second embodiment.

FIG. 13 is a configuration example of the gas heater 41 according to a second embodiment of the present invention. Since parts other than the gas heater 41 are the same as those in the first embodiment, only differences from the first embodiment will be described. The heat exchanger 44 in the second embodiment is configured using a porous ring 50 having innumerable pores 49. As the porous ring 50, a substance in which sponge-like porous material or innumerable spherical bodies (or bodies having other shapes) are integrally solidified can be used. Therefore, the shape of the pore 49 may be a shape other than the spherical shape as illustrated in FIG. 13. As a material of the porous ring 50, various materials such as ceramics and metal can be used as long as the material has sufficient heat resistance with respect to the operating temperature. Even in the second embodiment, the same effects as those of the first embodiment can be obtained. It is desirable that the porous material used in the second embodiment have a porosity of 50% or more such that the flow path conductance does not decrease too much.

Since a step of filling the heat exchanger 44 with the ceramic balls 48 is required in the first embodiment, the efficiency of assembling process of the ion source 2 is not so good. On the other hand, the porous ring 50 is an integrated member in the second embodiment, and thus, the assembly is completed by inserting the porous ring 50 into a gap provided in the gas heater 41. Therefore, there is an advantage that the assembling efficiency can be improved as compared with the first embodiment.

Third Embodiment

Figure 14:
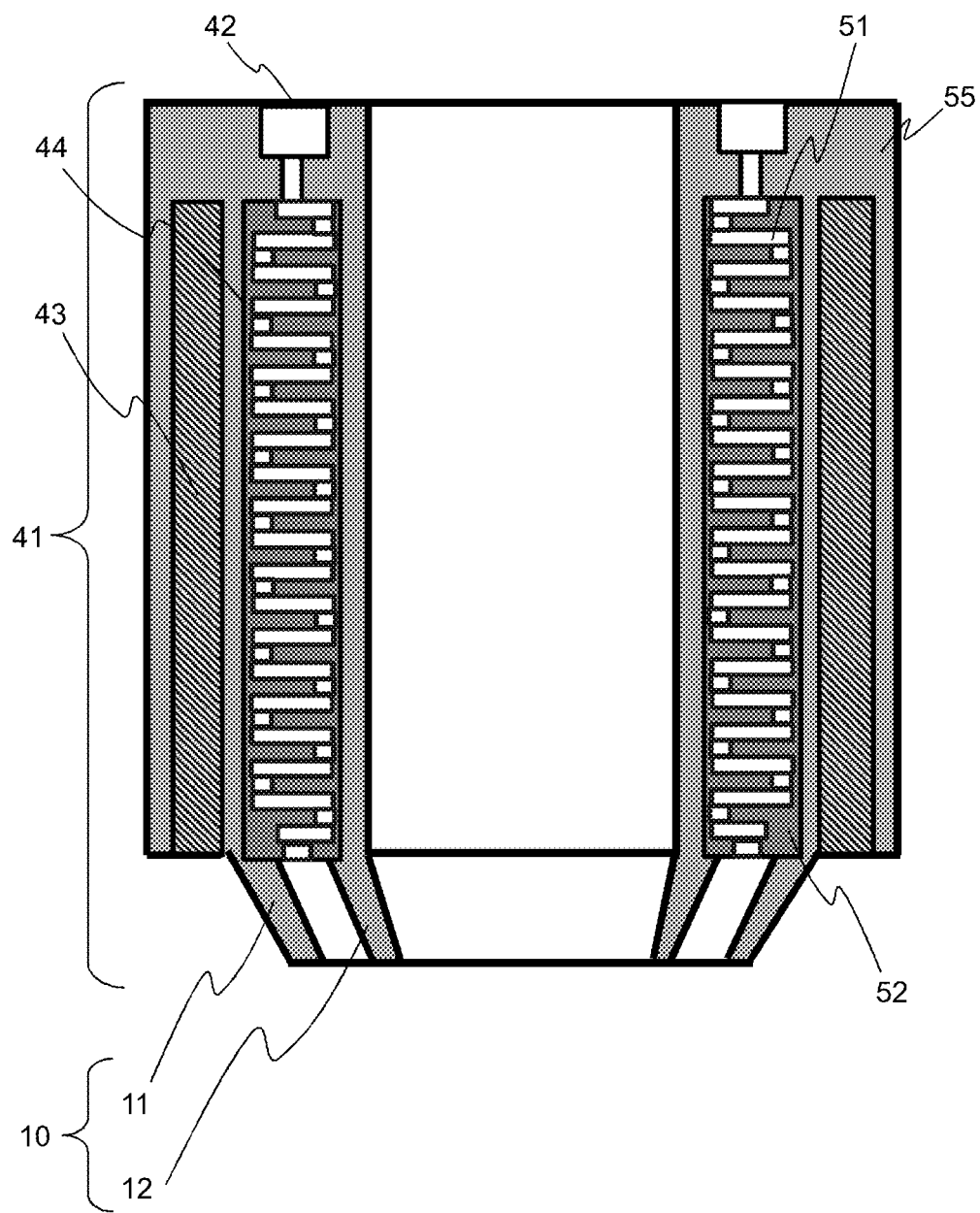
FIG. 14 is a configuration example of the gas heater 41 in a third embodiment.

FIG. 14 is a configuration example of the gas heater 41 according to a third embodiment of the present invention. Since parts other than the gas heater 41 are the same as those in the first embodiment, only differences from the first embodiment will be described. The heat exchanger 44 in the third embodiment is configured using a ring 52 having a minute flow path 51. The minute flow path 51 enables highly efficient heat exchange in a narrow range as in the first embodiment. As illustrated in FIG. 14, a heat transfer area to a gas can be increased by forming a structure in which the minute flow path 51 is bent in multiple steps in a plurality of times. The minute flow paths 51 are stacked in the Z-axis direction in FIG. 14, but may be stacked in the radial direction or the oblique direction.

As a material of the ring 52, various materials such as ceramics and metal can be used as long as the material has sufficient heat resistance with respect to the operating temperature. As a method for manufacturing the ring 52, a method of stacking and constructing a plurality of members, a method of integrating stacked members by bonding, welding, or other joining methods, and the like can be used. A bent portion of the minute flow path 51 may be a flow path in which the entire space between flow paths is connected, or may be configured so as to be partially connected by a plurality of holes or the like. Even in the third embodiment, the same effects as those of the first embodiment can be obtained.

In the third embodiment, the minute flow path 51 can be formed by drilling an appropriate material, and thus, a surface area, a shape, and the like can be formed in a relatively arbitrary manner. Therefore, there is an advantage that the conductance of a heated gas flow path and the heat transfer area can be freely designed.

As the heat exchanger 44, other configurations can also be adopted in addition to the configurations illustrated in the first to third embodiments as long as the heat transfer area is large and a flow rate near an outlet of the heat exchanger 44 can be uniformly distributed (or set to a nearly uniform state) in the radial direction, such as a stacked structure of filling of a flocculent substance having heat resistance and a mesh-like or honeycomb-like substance.

Fourth Embodiment

Figure 15:
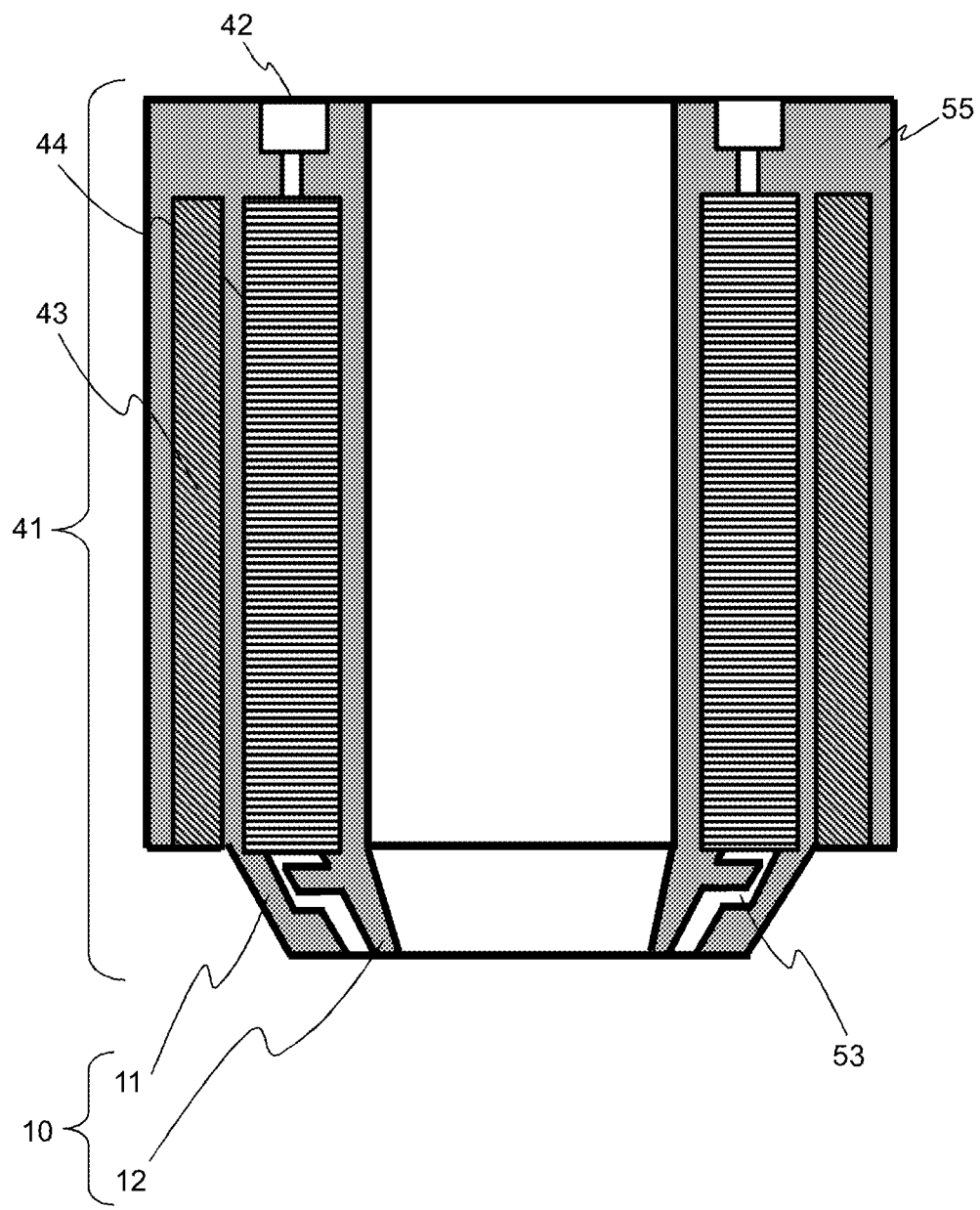
FIG. 15 is a configuration example of the gas heater 41 in a fourth embodiment.

FIG. 15 is a configuration example of the gas heater 41 according to a fourth embodiment of the present invention. Since parts other than the gas heater 41 are the same as those in the first embodiment, only differences from the first embodiment will be described. The heated gas spray nozzle unit 10 in the fourth embodiment has a minute flow path 53. Since the minute flow path 53 is formed in a bended shape, a flow rate distribution can be made more uniform during a gas emitted from the heat exchanger 44 is sprayed from a distal end of the heated gas spray nozzle unit 10.

The configuration of the heated gas spray nozzle unit 10 may be not only the configuration illustrated in FIG. 15 but also a configuration in which a radial distribution of a gas flow rate near an outlet of the heated gas spray nozzle unit 10 can be made uniform (or nearly uniform), such as a stacked structure of the spherical body or the porous material described in the first and second embodiments, a flocculent substance, and a mesh-like or honeycomb-like substance.

In the fourth embodiment, the conductance of a heated gas can be adjusted by providing the minute flow path 53 in the heated gas injection port. It is desirable to inject the heated gas gently to some extent in order to make a heat distribution of the heated gas uniform. The uniformity of the heat distribution can be improved by adjusting the conductance of the heated gas by the minute flow path 53. Therefore, there is an advantage that the stability and reproducibility are improved.

Fifth Embodiment

Figure 16:
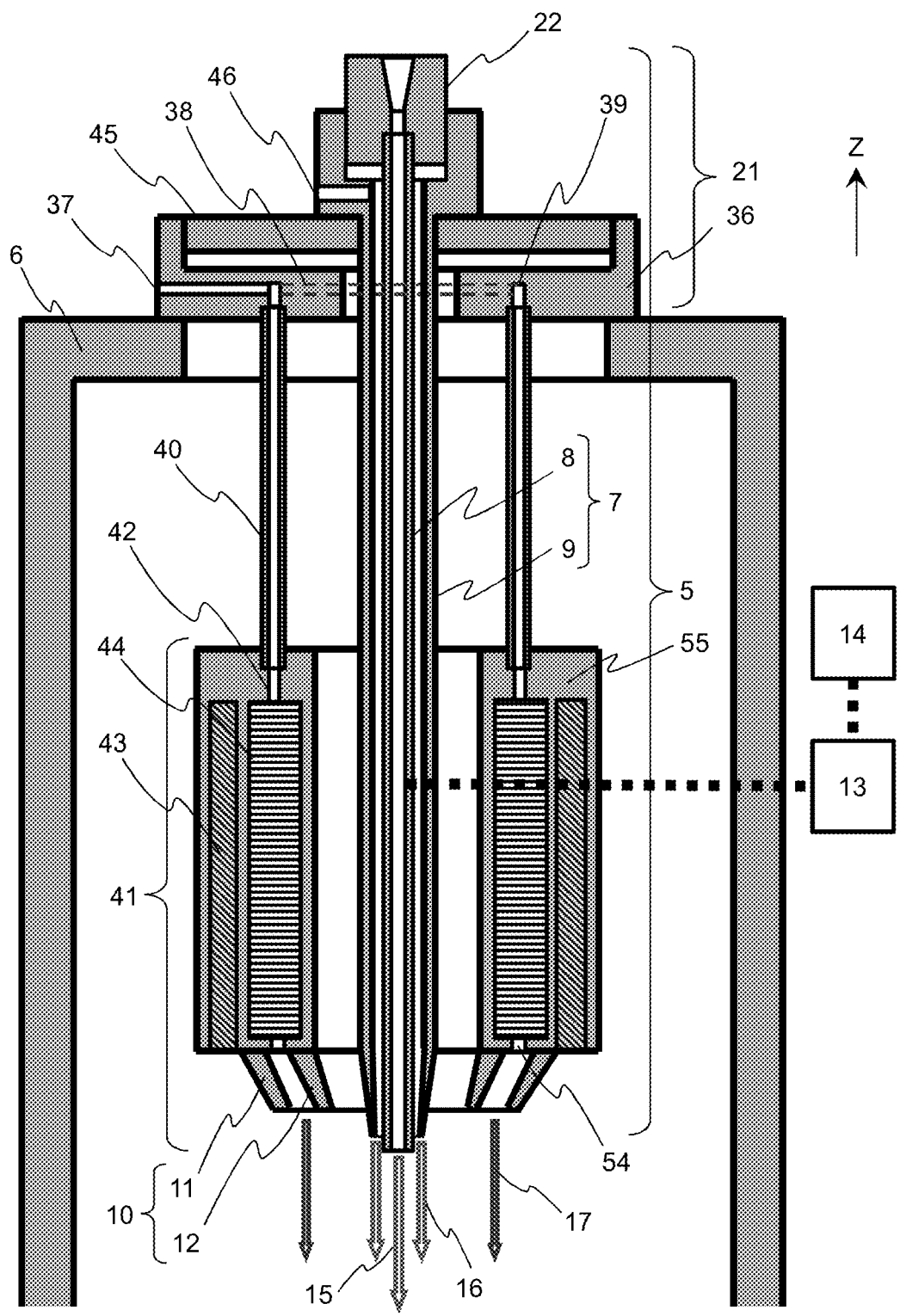
FIG. 16 illustrates a detailed structure of the ion generator 5 in a fifth embodiment.

FIG. 16 illustrates a detailed structure of the ion generator 5 according to a fifth embodiment of the present invention. Since parts other than the ion generator 5 are the same as those in the first embodiment, only differences from the first embodiment will be described. In FIG. 16, the heating block 55 has a plurality of holes 54 at an outlet portion of the heat exchanger 44. A member having the plurality of holes 54 is integrated with the heating block 55 in FIG. 16, but may be configured as a separate member. The member having the plurality of holes 54 may be a mesh-like member, a honeycomb-like member, or the like.

When the heat exchanger 44 is filled with the ceramic balls 48 as in the first embodiment, it is desirable to form a heated gas flow path as well as sealing the heat exchanger 44. According to the fifth embodiment, the heated gas flow path can be ensured by the holes 54 as well as sealing the lower side of the heat exchanger 44 to prevent the ceramic balls 48 from falling. In order to prevent the ceramic balls 48 from falling, a size of the hole 54 needs to be smaller than a particle size of the ceramic ball 48. In the case of the mesh-like or honeycomb-like member, a size of an opening needs to be smaller than the particle size of the ceramic ball 48. Although a flow rate of a heated gas can be uniformly distributed in the radial direction by arranging the holes 54 at equal intervals, the invention is not limited thereto as long as desired performance can be obtained.

Sixth Embodiment

Figure 17:
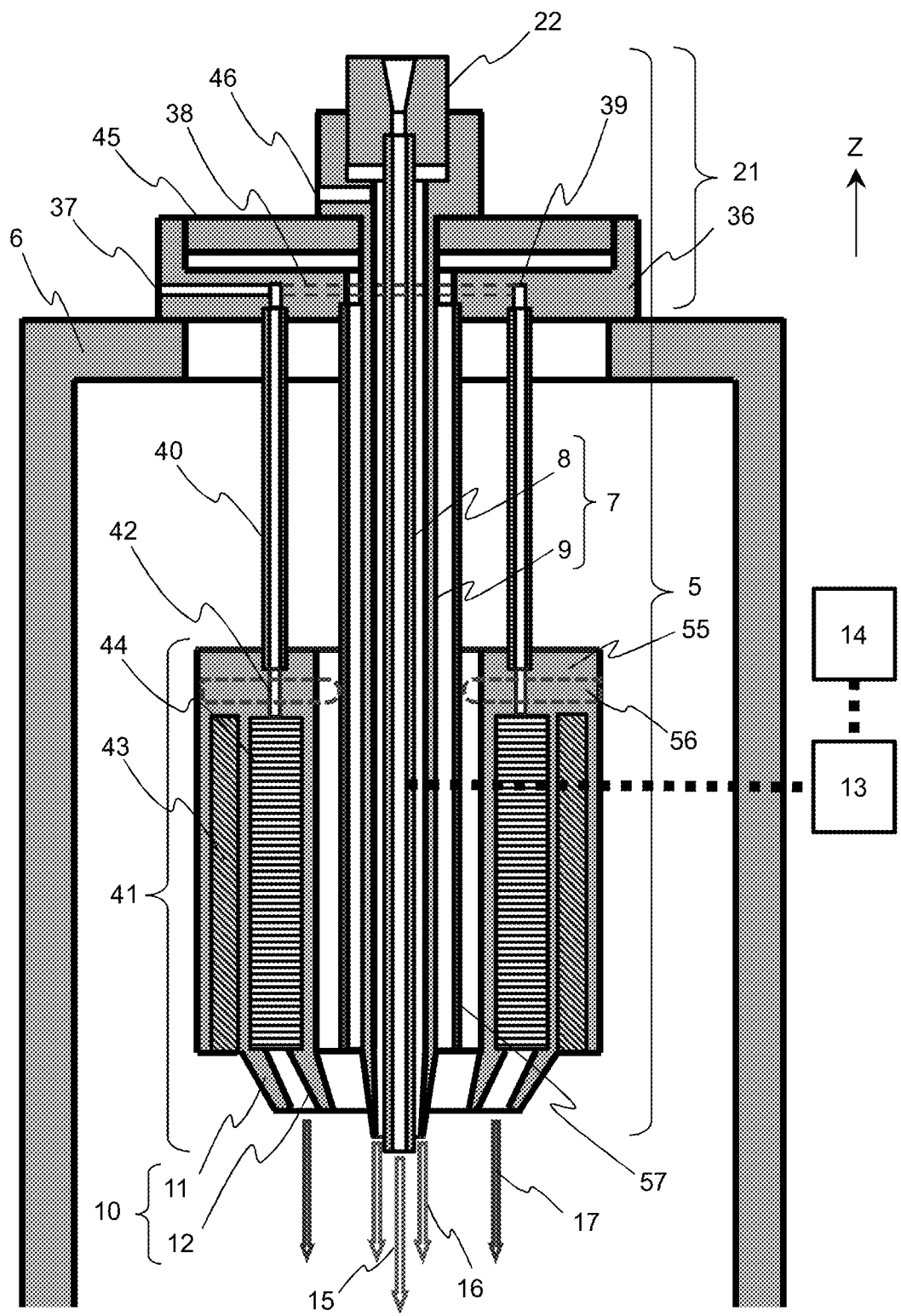
FIG. 17 illustrates a detailed structure of the ion generator 5 in a sixth embodiment.

FIG. 17 illustrates a detailed structure of the ion generator 5 according to a sixth embodiment of the present invention. Since parts other than the ion generator 5 are the same as those in the first embodiment, only differences from the first embodiment will be described. The ion generator 5 in the sixth embodiment has a centering mechanism 56 that aligns central axes of the ionization probe 7 and the heated gas spray nozzle unit 10. Distal ends of the ionization probe 7 and the heated gas spray nozzle unit 10 on the downstream side are far away from the fixed side (the gas flow path branch unit 36), and further are suspended by different members. Thus, it is difficult to assemble the both such that the central axes thereof are aligned even if the accuracy of each of the parts is enhanced. In order to solve this problem, the central axes of the both are aligned by the centering mechanism 56 in the sixth embodiment.

Figure 18:
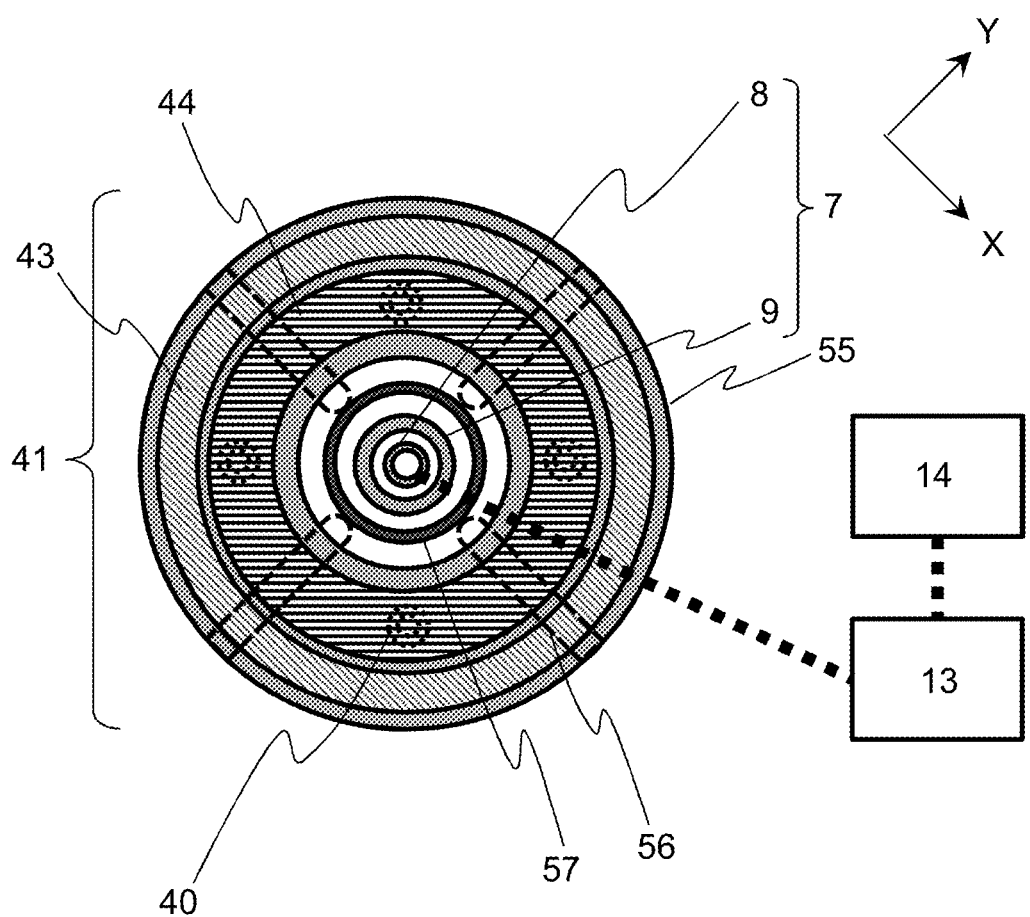
FIG. 18 is a cross-sectional view of the gas heater 41 in a sixth embodiment.

FIG. 18 is a cross-sectional view of the gas heater 41 in the sixth embodiment. The centering mechanism 56 is a set screw, and a plurality of the centering mechanisms 56 are arranged along the circumferential direction of the gas heater 41. As the centering mechanisms 56 screwed into the heating block 55 are pressed against the ionization probe 7, relative positions of the both change, so that the central axes of the both can be aligned. Meanwhile, the ionization probe 7 itself is thin, and thus, is likely to be deformed by pressing. Therefore, in the sixth embodiment, a cylinder 57 is provided between the ionization probe 7 and the centering mechanism 56, and the cylinder 57 is pressed by the centering mechanism 56. Since the cylinder 57 is connected to the gas flow path branch unit 36, relative positions of the ionization probe 7 and the gas heater 41 in the Z-axis direction can be adjusted by the position adjustment mechanism B (not illustrated) as illustrated in the first embodiment. On the other hand, if the cylinder 57 is not provided, it is difficult for the ionization probe 7 to move in the Z-axis direction due to friction with a distal end of the centering mechanism 56 when the centering mechanism 56 presses the ionization probe 7.

A contact area with the cylinder 57 can be minimized by making the distal end of the centering mechanism 56 spherical as illustrated in FIGS. 17 and 18, and thus, the heat conduction from the gas heater 41 to the cylinder 57 can be minimized. Further, the amount of heat transfer to the cylinder 57 is made uniform in the radial direction by arranging the centering mechanisms 56 at equal intervals along the circumferential direction as illustrated in FIG. 18, and thus, the effect of making the heat distribution uniform can be also exhibited. However, the invention is not limited thereto as long as desired performance can be obtained.

It is preferable that the pipe 40 have a small outer diameter in order to enhance a heat insulating effect. Then, the thin pipe 40 is easily deformed, and thus, the amount of movement at the time of centering can be absorbed by the deformation, which is convenient for the centering operation.

In the ion source 2 according to the sixth embodiment, center positions of the ionization probe 7 and the gas heater 41 can be aligned by the centering mechanism 56. As a result, it is possible to suppress the positioning accuracy of each part at a minimum level as well as to minimize a performance difference between devices.

Seventh Embodiment

Figure 19:
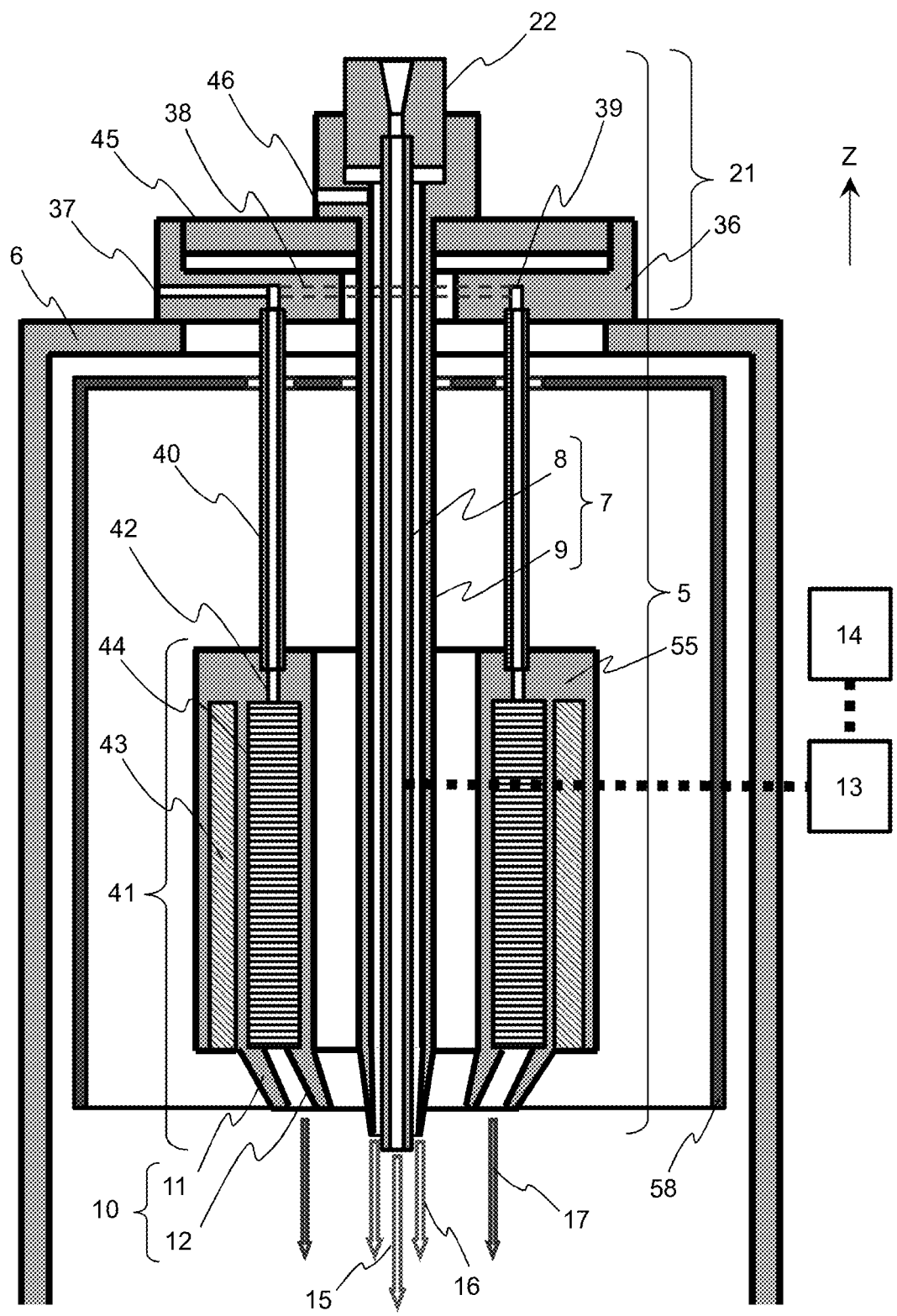
FIG. 19 illustrates a detailed structure of the ion generator 5 in a seventh embodiment.

FIG. 19 illustrates a detailed structure of the ion generator 5 according to a seventh embodiment of the present invention. Since parts other than the ion generator 5 are the same as those in the first embodiment, only differences from the first embodiment will be described. The ion generator 5 in the seventh embodiment has a heat-shielding member 58 between the gas heater 41 and a peripheral housing such as the gas flow path branch unit 36 and the ion source chamber 6. The heat-shielding member 58 can minimize heat radiation from the gas heater 41 to the peripheral housing.

According to the seventh embodiment, further improvement in safety can be realized, and temperature variations of power supplies can be suppressed, so that the stability of analysis is also improved.

<Regarding Modifications of Present Invention>

The present invention is not limited to the above-described embodiments, and includes various modifications. For example, the above-described embodiments have been described in detail in order to describe the present invention in an easily understandable manner, and are not necessarily limited to one including the entire configuration that has been described above. In addition, some configurations of a certain embodiment can be substituted by configurations of another embodiment, and further, a configuration of another embodiment can be added to a configuration of a certain embodiment. Further, addition, deletion or substitution of other configurations can be made with respect to some configurations of each embodiment.

Figure 20:
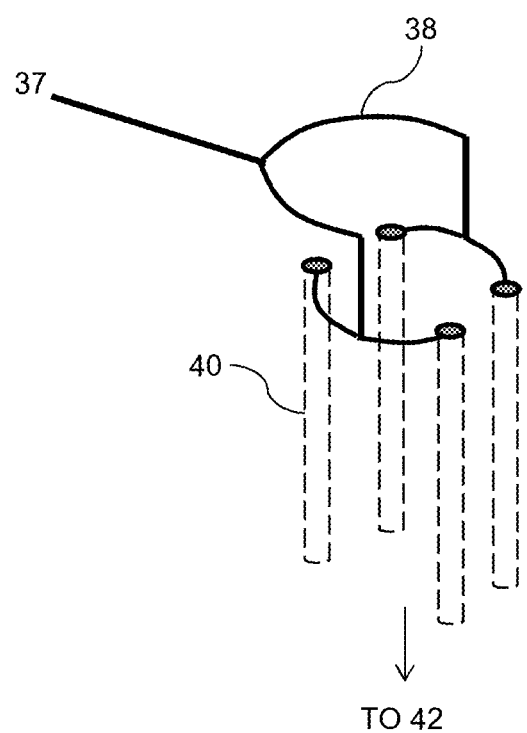
FIG. 20 is a schematic perspective view illustrating a configuration example of a branch flow path inside a probe holder.

FIG. 20 is a schematic perspective view illustrating a configuration example of a branch flow path inside a probe holder. It is desirable that the length of a heated gas flow path from a gas introduction port to the inlet 42 be uniform for each of the pipes 40 in order to make a heat distribution in the gas heater 41 uniform. Therefore, it is desirable that the length of the branch flow path 38 be the same in the hole 37 to the pipe 40. For example, when the number of the pipes 40 is four as illustrated in FIG. 20, it is preferable to make the branch flow path 38 first branch into two flow paths having the same length, make each of the branch paths further branch into two flow paths having the same length, and provide inlets of the pipes 40 at end points of the branches. The branch flow path 38 may appropriately configured such that the flow path lengths from the holes 37 to the pipes 40 are equal according to the number of the pipes 40.

REFERENCE SIGNS LIST 1 mass spectrometer
2 ion source
3 mass spectrometry unit
4 vacuum container
5 ion generator
6 ion source chamber
7 ionization probe
8 capillary
9 gas spray tube
10 heated gas spray nozzle unit
11 outer cylinder
12 inner cylinder
13 power supply
14 controller
15 to 17 arrow
18 introduction electrode
19 hole
20 power supply
21 upper portion
22 connector
23 exhaust port
24 window
25 ion analyzer
26 to 28 vacuum chamber
29 to 30 hole
31 detector
32 to 34 vacuum pump
35 ion transport unit
36 gas flow path branch unit 37 hole
38 branch flow path
39 outlet
40 pipe
41 gas heater
42 inlet
43 heat generator
44 heat exchanger
45 member
46 hole
47 cavity
48 ceramic ball
49 pore
50 porous ring
51 minute flow path
52 ring
53 minute flow path
54 hole
55 heating block
56 centering mechanism (set screw)
57 cylinder
58 heat-shielding member

The invention claimed is:

1. An ion source, which ionizes a sample, comprising:
a probe through which a solution containing the sample passes;
a heated gas injection port which injects an inert heating gas that heats a substance injected from the probe;
a heater which increases a temperature of the inert heating gas before the heated gas injection port injects the inert heating gas; and
a gas introduction port which supplies the inert heating gas to the ion source,
wherein the heater includes first and second heater gas inlets that receive the inert heating gas supplied from the gas introduction port to the ion source,
the gas introduction port and the first heater gas inlet are connected by a first pipe extending along an extending direction of the probe,
the gas introduction port and the second heater gas inlet are connected by a second pipe extending along the extending direction of the probe,
the first pipe and the second pipe are configured as pipes having flow paths independent from each other,
the heater is arranged so as to surround an outer surface of the probe along the extending direction of the probe, and
the first pipe and the second pipe are arranged so as to extend along the extending direction of the probe in a space between the gas introduction port and the heater.

2. The ion source according to claim 1, wherein
the heater includes: a heat generator that generates heat; and a heat exchanger that increases the temperature of the inert heating gas by propagating the heat generated from the heat generator to the inert heating gas,
the first pipe and the second pipe are arranged so as to supply the inert heating gas to the heat exchanger, and
the heated gas injection port is configured to inject the inert heating gas having passed through the heat exchanger into a peripheral space of an injection port of the probe.

3. The ion source according to claim 1, further comprising a probe holder that holds the probe,
wherein the probe holder further includes:
a first branch path that propagates the inert heating gas, supplied to the gas introduction port, to the first pipe; and
a second branch path that propagates the inert heating gas, supplied to the gas introduction port, to the second pipe.

4. The ion source according to claim 3, wherein the first branch path and the second branch path are configured such that a flow path length of the inert heating gas from the gas introduction port to the first pipe via the first branch path and a flow path length of the inert heating gas from the gas introduction port to the second pipe via the second branch path are equal to each other.

5. The ion source according to claim 1, wherein
the heater has a cylindrical shape that surrounds the outer surface of the probe along the extending direction of the probe, and
the first heater gas inlet and the second heater gas inlet are arranged at an equal interval in a periphery of the probe on a plane perpendicular to the extending direction of the probe.

6. The ion source according to claim 1, wherein the heated gas injection port is formed in an annular shape surrounding a periphery of the probe.

7. The ion source according to claim 1, wherein
the heater includes: a heat generator that generates heat; and a heat exchanger that increases the temperature of the inert heating gas by propagating the heat generated from the heat generator to the inert heating gas, and
the heat exchanger is configured using a sphere filler.

8. The ion source according to claim 1, wherein
the heater includes: a heat generator that generates heat; and a heat exchanger that increases the temperature of the inert heating gas by propagating the heat generated from the heat generator to the inert heating gas, and
the heat exchanger is configured using a porous material.

9. The ion source according to claim 1, wherein
the heater includes: a heat generator that generates heat; and a heat exchanger that increases the temperature of the inert heating gas by propagating the heat generated from the heat generator to the inert heating gas, and
the heat exchanger has a bent flow path through which the inert heating gas passes.

10. The ion source according to claim 1, wherein the heater and the heated gas injection port are connected by a bent flow path through which the inert heating gas passes.

11. The ion source according to claim 1, wherein
the heater includes: a heat generator that generates heat; and a heat exchanger that increases the temperature of the inert heating gas by propagating the heat generated from the heat generator to the inert heating gas, and
the heat exchanger and the heated gas injection port are connected by a plurality of outlet paths, and the outlet paths are arranged concentrically at an equal interval in a periphery of the probe.

12. The ion source according to claim 7, wherein the heat exchanger and the heated gas injection port are connected by a plurality of outlet paths, and an opening diameter of each of the outlet paths is smaller than a diameter of the sphere.

13. The ion source according to claim 1, further comprising a centering mechanism unit configured to adjust a center position of the heated gas injection port with respect to a center position of the probe.

* * * * *